United States Patent [19]
Lin et al.

[11] Patent Number: 4,988,576
[45] Date of Patent: Jan. 29, 1991

[54] WOOD PRESERVATIVE

[75] Inventors: Stephen Y. Lin, Wausau; Lori L. Bushar, Mosinee, both of Wis.

[73] Assignee: Daishowa Chemicals Inc., Rothschild, Wis.

[21] Appl. No.: 450,591

[22] Filed: Dec. 13, 1989

[51] Int. Cl.$^5$ ............................. B27K 3/00; B27K 3/38
[52] U.S. Cl. .................................. 428/537.1; 428/541; 527/400; 527/403
[58] Field of Search .......................... 428/541, 537.1; 527/400, 403

[56] References Cited

U.S. PATENT DOCUMENTS

| | | | |
|---|---|---|---|
| 4,661,382 | 4/1987 | Cook | 428/541 |
| 4,752,509 | 6/1988 | Simonson et al. | 428/541 |
| 4,871,825 | 10/1989 | Lin | 527/400 |
| 4,891,415 | 1/1990 | Lin et al. | 527/400 |

Primary Examiner—James Seidleck
Assistant Examiner—Don Sumihiro
Attorney, Agent, or Firm—Andrus, Sceales, Starke & Sawall

[57] ABSTRACT

A wood preservative composition comprising a lignosulfonate copolymer and a metal salt or a combination of metal salts. The copolymer is a reaction product of lignosulfonate and acrylic monomers selected from a group of acrylic compounds of the general formula, $RCH=CR^1COOH$, where R is hydrogen, an alkyl or carboxyl group and $R^1$ is hydrogen or an alkyl group, and the metal salt is a salt of sulfate, chloride, phosphate, or carbonate wherein the metal is selected from the group consisting of copper, zinc, mercury and lead. Alternatively, the composition may be a metal salt or a combination of metal salts of a lignosulfonate copolymer produced by base exchange of the corresponding calcium lignosulfonate copolymer with a metal salt or metal salts. The composition may be used, optionally, together with methylol phenol.

13 Claims, No Drawings

WOOD PRESERVATIVE

BACKGROUND OF THE INVENTION

This invention relates to wood preservatives, and more particularly, it is related to a wood preservative composition comprising a metal salt and a graft copolymer of lignosulfonate.

In the United States, as in many other countries possessed of abundant timber resources, wood has always been an important construction material. Its good availability, great strength, ease of shaping and fastening, low heat conductivity, and sound-deadening qualities, have made it the outstanding building material since early human history. However, two major destructive forces of wood are fire and decay. While fire is often caused by human factors, decay is due to biological attacks by microorganisms (such as fungi and bacteria), marine borers and insects. Much of the decay of wood in service is inevitable. It is particularly severe as a result of the activities of low forms of plants known as wood-destroying fungi. This type of fungi often causes extensive damage and financial loss to buildings in the temperate zone.

The conditions necessary for the development of decay-producing fungi in wood are: (1) a supply of suitable wood, (2) a sufficient amount of moisture, (3) at least a small amount of air, and (4) a favorable temperature. A deficiency in any of these requirements will inhibit the growth of a fungus, and reduce the decay of wood. Under normal service conditions of wood, the deficiency is difficult to maintain. So, a more common method for preserving wood against the fungal attacks is to impregnate it with certain wood preservatives. There are two types of wood preservatives. Oil-borne preservatives include creosote, pentachlorophenol, copper naphthenate, zinc naphthenate, copper-8-quinolinolate and others. Important water-borne preservatives are arsenic salts, boric acid, chromium salts, chromated zinc chloride, copper sulfate, mercuric chloride, sodium pentachlorophenate, zinc sulfate, chromated copper arsenate, etc. For more details on the above-mentioned preservatives, see Hunt and Garratt, *Wood Preservatives*, McGraw-Hill, New York, 1953.

According to a marketing study (*Forest Industries*, November 1985, pp. 36–38), chromated copper arsenate (or CCA) is the current most widely used lumber preservative. About 95% of treated lumber (a total of 4 billion board feet in 1984) is treated with CCA, a water-borne preservative composed of metallic salts. CCA gives the lumber the best available protection against decay and insects. Southern yellow pine from southern lumber mills represents almost three-quarters of treated lumber. The rest is treated yellow pine lumber in the Northeast and treated ponderosa pine in the Midwest. Wood preservatives such as those described above have been applied to the wood as solutions, emulsions, pastes or dispersions in liquid hydrocarbons and/or aqueous systems. In many applications, aqueous systems are preferred over liquid hydrocarbons because of the odors, flammability and often toxic nature of the hydrocarbon products. In contrast, water-borne preservatives tend to be less odorous, non-flammable and give a clear appearance to the treated wood. Yet, the aqueous preservative compositions often contain chromium and arsenate that are considered to constitute a significant risk to human health and the environment. For these and other reasons, a need exists for low-cost, non-hazardous, water-borne preservatives that contain no toxic chemicals. A common approach to achieving the object in the prior art involves fixation of certain metals such as zinc, copper, mercury, antimony, lead and so on in the wood with organic chemical compounds. For example, U.S. Pat. No. 4,783,221 (Nov. 8, 1988) teaches the use of a preservative composition comprising a metal salt of organic carboxylic acid of six to about 30 carbon atoms and an isothiazolone compound in preserving wood. Swedish Patent No. SE 430865 B (Dec. 19, 1983) reveals a preservative composition containing copper or zinc salt of acetic and propionic acid. Australian Patent AU 519416 B2 (Nov. 12, 1981) discloses a mixture of copper oxide, decanoic acid and ethanolamine. Canadian Patent No. CA 978474 (Nov. 25, 1975) claims the use of zinc or copper salt of fatty acids as wood preservatives. And disclosed in Belgian Patent BE 903306 A4 (Jan. 16, 1986) is a wood preservative consisting of 87 parts of citric acid, 100 parts of copper carbonate and 446 parts of 30% $NH_3$ that is claimed to improve the resistance of pine wood to attacks by fungi and insects.

Quite recently, in European Patent Application No. 86850112.3 (Apr. 1, 1986), a method for the impregnation of wood is revealed for preventing the attack by fungi and bacteria. The method comprises the application of an aqueous solution of an alkali lignin modified into a water-soluble form, characterized in that the impregnation takes place in two stages, these being an initial stage in which the aqueous solution containing the lignin, still in its water-soluble form and with a pH not exceeding 10, is applied to the timber (wood) in order to be absorbed by it, and a second stage in which the lignin is fixed by being transformed into an essentially water-insoluble form in order to be retained in the timber, said second stage involving the application of a weakly acidic aqueous solution containing a metal salt or a combination of metal salts, said metal being zinc, copper or aluminum. The most common alkali lignin is the kraft lignin (or sulfate lignin) produced in the pulping of wood by the kraft process. The other alkali lignin is the lignin produced in the soda pulping process (soda lignin, currently not available commercially). Alkali lignin is generally water-insoluble and may be rendered water-soluble by certain carboxylation and sulfonation reactions as are practiced in EP 86850112.3. The nature of alkali lignin is such that in a mildly carboxylated and/or sulfonated form, it is water-soluble at neutral or slightly alkaline pH, but becomes insolubilized at an acidic pH. The so-called water-soluble modified alkali lignin also tends to be "salted-out" by metal salts. This is the principle of fixation of lignin (with weakly acidic solution of metal salts) taught by EP 86850112.3.

The other major type of lignin produced by the paper industry is sulfite lignin (or lignosulfonate) from pulping of wood by the sulfite process Lignosulfonate is water-soluble at all pH's, including acidic, neutral and alkaline pH's. In general, it cannot be insolubilized by addition of mineral acids or metal salts. Therefore, lignosulfonate as derived normally from the sulfite pulping liquors cannot be "fixed" into the wood by the two-step method of said European Patent Application No. 86850112.3. Lignosulfonate absorbed into the wood that is subsequently treated with a metal salt such as copper and zinc salts, is easily leached out of the wood by water and loses its effectiveness as a wood preservative.

Currently, only two types of commercial lignins are available in the marketplace, namely, kraft lignin and lignosulfonate. The production capacity of lignosulfonate is estimated at 1,340 million kilograms per annum in the Western World and that of kraft lignin is only about 45 million kilograms per annum. The unproportionally greater quantity of commercially available lignosulfonate makes it attractive and desirable to produce a wood preservative composition based on sulfite lignin. Furthermore, it will be advantageous to have a lignin-based wood preservative that can be applied to the wood by a one-step method, instead of the two-step method taught in the prior art.

It is thus an object of the invention to provide a water-borne preservative for protecting wood against microorganism attacks.

It is a further object of the invention to provide a wood preservative that is based on lignosulfonate from spent sulfite pulping liquors.

It is an additional object of the invention to provide a low-cost wood preservative from the solids of spent sulfite pulping liquor.

It is another object of the invention to provide a lignosulfonate-based preservative that can be applied to the wood by a simple, one-step impregnation method.

It is a specific object of the invention to provide a wood preservative that is essentially non-toxic.

SUMMARY OF THE INVENTION

It has now been found that certain of the foregoing and related objects of the present invention are readily attained in a wood preservative composition comprising a mixture of a lignosulfonate copolymer and a metal salt or a combination of metal salts, said copolymer is a reaction product of lignosulfonate and acrylic monomers selected from a group of acrylic compounds of the general formula, $RCH=CR^1COOH$, where R is hydrogen, an alkyl or carboxyl group and $R^1$ is hydrogen or an alkyl group, and said metal salt is a salt of sulfate, chloride, phosphate, or carbonate wherein the metal is selected from the group consisting of copper, zinc, mercury and lead. Alternatively, the objects of the invention may be attained by a metal salt or a combination of metal salts of a lignosulfonate copolymer produced by base exchange of the corresponding calcium lignosulfonate copolymer with a metal salt or metal salts wherein the metal is copper, zinc, mercury or lead. The novel composition of the invention is useful for preservation of wood, and may be used, optionally, together with methylol phenol. The composition is absorbed into the wood by any of the standard impregnation procedures and preferably by using a suitable vacuum/pressure cycle. The treated wood is dried at 105° C. to 120° C., or air dried at ambient temperature to effect the condensation of the copolymer and methylol phenol, thus causing the fixation of the metal salt(s) of said copolymer in the wood.

DETAILED DESCRIPTION OF THE INVENTION

In accordance with a preferred embodiment of the invention, an effective wood preservative composition is prepared by mixing a graft copolymer of lignosulfonate, optionally, methylol phenol (hydroxyl benzyl alcohol), and a metal salt or a mixture of metal salts wherein the metal is selected from the group of copper, zinc, mercury and lead. Based on a specific embodiment of the invention, the composition contains said copolymer, methylol phenol and metal salt in amounts such that the ratio of the three components is from 1:0:0.01 to 1:0.5:1.2, respectively. The metal salts contemplated for use in the invention include metal chloride, phosphate, sulfate or carbonate. In addition, any of the wide variety of other water-soluble salts can also be utilized in the composition of the invention.

According to another embodiment of the invention, the calcium salt of a graft copolymer of lignosulfonate (e.g., when calcium lignosulfonate is employed for preparing the copolymer) is "base-exchanged" with a metal salt of sulfate to yield the metal salt of said lignosulfonate and water-insoluble calcium sulfate which may be separated by a suitable process such as filtration. For example, a graft copolymer of calcium lignosulfonate is treated with cupric sulfate (both are water-soluble) to give a cupric salt of lignosulfonate copolymer and hydrated calcium sulfate (gypsum). Gypsum (water-insoluble) is then separated from the invention wood preservative by filtration.

The copolymer of lignosulfonate for use in the invention is a reaction product of said lignosulfonate with one or more of acrylic monomers of the general formula, $RCH=CR^1COOH$, where R is hydrogen, an alkyl or carboxyl group, and $R^1$ is hydrogen or an alkyl group. Specifically, the acrylic monomers contemplated for use in the invention are selected from the group of acrylic acid, methacrylic acid, methyl methacrylic, and maleic acid. Suitable lignosulfonate employed herein may be obtained from spent sulfite pulping liquor that contains 3-10% organic sulfur. Graft copolymerization may be performed according to any of the well known procedures. For example, in our co-pending U.S. Pat. No. 4,891,415, a process for grafting lignin with acrylic monomers is revealed comprising: (1) forming a lignin solution having a solids concentration of 20% to 60%, pH 1 to 4 and containing 0.1 to 0.5% of ferrous sulfate by weight of lignin solids; (2) continuously feeding into said lignin solution an acrylic monomer or a mixture of acrylic monomers; (3) simultaneously, but separately, feeding into said lignin solution an initiator (e.g., $H_2O_2$, organic peroxide, etc.).

Graft polymerization of lignosulfonate can also be carried out according to batch processes of the prior art; for example, see Koshiyima and Muraki, J. Polymer Sci. 6 (1968) : 1431; J. Japan and Wood Res. Soc. 13 (1967) : 355; Naveau, Cellulose Chem. Technology 9 (1975) : 7; Chernyavskaya and Berlin, Kim. Drev. 1 (1978) : 96; Chen, J. Appl. Polymer Sci 25 (1980) : 2211-2220. As a general mode of operation, the grafting processes and methods of the above-cited prior art comprise mixing the whole quantity of a acrylic monomer into a lignin solution and subsequently initiating the grafting reaction by addition of certain initiators. The initiators commonly used are hydrogen peroxide, organic peroxide and persulfate.

Methylol phenol, or methylol hydroxybenzene, is produced by methylolation of phenol according to a procedure disclosed in U.S. Pat. No. 4,444,562. Thus; one mole of phenol is reacted with 1 to 3 moles of formaldehyde. The reaction is effected at atmospheric pressure by slowly adding formaldehyde to an aqueous solution of the phenol (the phenol being present in a concentration of about 40 to 50 percent by volume), the pH of which is adjusted with sodium hydroxide to a value of about 11 to 11.5. A temperature of about 70° to 80° C. is maintained for a period of time (typically, about one-half to two hours) sufficient to effect substantially complete conversion, as determined by analysis for residual formaldehyde. The methylol phenol useful with the present composition has the general formula:

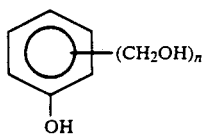

where n is an integer from 1 to 3.

In accordance with a specific embodiment of the invention, in the preparation of a wood preservative composition, the graft copolymer is admixed with said methylol hydroxybenzene prior to addition of a metal salt or a combination of metal salts, the pH of the mixture of said copolymer and methylol hydroxybenzene being maintained between 1 and 4.5, preferably between 2 and 3.5. If the pH value is above 5, undesirable insolubles invariably form in the final composition upon addition of said metal salts, e.g., zinc sulfate, copper sulfate, etc. To minimize the formation of insolubles, it is advisable that the invention wood preservative composition be prepared at a solids concentration of less than 40%.

Alternatively, a wood preservative of the invention is prepared by treating a graft copolymer of calcium lignosulfonate with a metal salt, at an acidic pH of 2 to 4, thereby a metal lignosulfonate copolymer (wood preservative) and gypsum are formed and thereafter separated by filtration. In this mode of operation, the invention wood preservative is a metal salt of an organic polymer (graft copolymer) substantially devoid of inorganic materials.

As used herein, the term "lignosulfonate" or "sulfite lignin" refers to the sulfonated lignin material conventionally and inherently obtained during the sufite pulping of wood, and is the principal constituent of spent sulfite liquor. It also refers to the spent sulfite liquor solids which contain, besides the principal constituent, wood sugars and other organic compounds. The inclusion of these minor components in a lignosulfonate product is not detrimental to the invention composition. In addition, said lignosulfonate and spent sulfite liquor solids may be subject to a fermentation process, alkali oxidation or other treatments to effect changes in these materials provided the degree of sulfonation in said lignosulfonate is sufficient to maintain good water solubility so that its graft copolymer is soluble at pH of 1 to 4.5 in the presence of metal salt(s). This solubility requirement of the invention composition is in contrast to the teaching of the prior art (e.g., EP 86850112.3) that requires the lignin to be insoluble in a weakly acid solution (pH 3 to 7) in the presence of metal salts. The distinction between the invention and prior art is clear in that while the prior art lignin is "fixed" (or rendered insoluble) in the wood by acid and metal salt (a salting-out effect), the invention lignosulfonate copolymer is soluble in acid water of pH 1 to 4.5 even in the presence of metal salts. The fixation mechanism of the invention composition is thus quite different from the teaching of the prior art. It is thought that the invention composition is retained in the wood by further in situ condensation of the lignosulfonate copolymer and methylol phenol and/or condensation of said copolymer itself during the drying process of the wood. The data from a leaching experiment indicate that the condensations indeed occur.

The wood preservative composition of the invention provide good protection against decay of wood. In treatment of wood with the composition, any standard impregnation procedure may be used, and particularly the vacuum/pressure cycles of wood preservation treatment process can be followed. It is recommended that green wood (lumber, log, etc) be placed in a solution of said preservative composition of suitable concentration (depending on the retention rate desired) under vacuum for a period of 10 to 60 minutes, and subsequently subjected to a pressure of 100 to 150 psi for a period of 60 to 90 minutes. The impregnated wood is either air dried over a lengthy period or oven dried at 105° to 120° C. For information on pressure treatments of wood with preservative, see *Wood Preservation* by Hunt and Garratt, McGraw-Hill, New York, 1953 or other suitable textbooks.

The practice and advantages of this invention may be clearly seen in the following examples.

EXAMPLES 1-4

These examples demonstrate the benefits of modified lignosulfonates over unmodified counterpart for fixation of copper in wood. Thus, one part of a modified lignosulfonate as prepared by grafting a softwood lignosulfonate, Lignosol X available from Daishowa Chemicals Inc., with 40% by weight of acrylic acid (AA), was mixed with 0.2 part of methylol phenol and 0.25 part of copper sulfate ($CuSO_4$). Pine wood blocks ($4.5 \times 4.5 \times 4.5$ cm$^3$) were placed in a 2-liter Parr bomb with a 10% solution of the mixture, and the contents were subjected to vacuum (using a pump) for 30 minutes and subsequently to a nitrogen pressure of 150 psi for 60 minutes. The impregnated wood blocks were dried in an oven at 105° C. overnight. The weight loss of the blocks was determined. The soaking/drying cycles were repeated. The percentage of the preservative retained in the wood blocks after each cycle is shown in Table 1. The data indicate that the best retention (lowest leachability) of the wood preservative is achieved by a mixture of methylol phenol and the graft copolymer of lignosulfonate.

TABLE 1

| | Leachability of cupric lignosulfonate and its copolymers. | | | | | | |
|---|---|---|---|---|---|---|---|
| | | % Preservative Retained in Wood After Number of Leaching/ Drying Cycles | | | | | |
| Example | Composition | 1 | 2 | 3 | 4 | 5 | 6 |
| 1 | Lignosol X + 25% $CuSO_4$ | 59 | 30 | 17 | 6 | 0 | |
| 2 | Lignosol X + 20% methylol phenol + 25% $CuSO_4$ | 71 | 54 | 44 | 37 | 26 | 21 |
| 3 | Lignosol X grafted with 40% acrylic acid + 25% $CuSO_4$ | 77 | 66 | 53 | 48 | 32 | |
| 4 | Lignosol X grafted with 40% acrylic acid + 20% methylol phenol + 25% $CuSO_4$ | 92 | 84 | 75 | 57 | 45 | 35 |

EXAMPLES 5-16

Pine wood blocks ($4.5 \times 4.5 \times 4.5$ cm$^3$) were impregnated as in Examples 1-4 with various amounts of $CuSO_4$ and the modified softwood lignosulfonate of Example 4, air dried and placed on the forest land of Rib Mountain in Central Wisconsin in June, 1987. After two years and three months, the blocks were recovered and their weight loss determined. The data in Table 2 indicate that the invention wood preservative composition was effective for protecting pine wood from decay. There is a significant benefit in the combination of copper and the modified lignosulfonate. Neither the lignosulfonate nor copper individually is completely effective.

TABLE 2

Weight loss (%) of pine wood blocks placed on a forest land after two years and three months.

| Example | % on Wood Dry Weight | | Average Weight Loss (%) |
|---|---|---|---|
| | Modified Lignosulfonate* | Copper | |
| 5 (control) | 0 | 0 | 23.4 |
| 6 | 0 | 0.4 | 8.4 |
| 7 | 0 | 0.8 | 14.5 |
| 8 | 5 | 0 | 21.6 |
| 9 | 5 | 0.4 | 4.4 |
| 10 | 5 | 0.8 | 2.5 |
| 11 | 10 | 0 | 3.9 |
| 12 | 10 | 0.4 | 3.0 |
| 13 | 10 | 0.8 | 1.6 |
| 14 | 15 | 0 | 6.3 |
| 15 | 15 | 0.4 | 0.54 |
| 16 | 15 | 0.8 | 0.06 |

*Softwood lignosulfonate (Lignosol X) grafted with 40% acrylic acid and 20% methylol phenol.

Thus, it can be seen that the present invention provides novel wood preservative compositions from modified lignosulfonates which is water-soluble at low pH's (1 to 4.5), and, when impregnating wood with it, offers good protectin against decay (as demonstrated in a long-term field test). Moreover, the composition of the invention affords a low-cost, non-toxic alternative to current wood preservatives being employed in the industry. In addition, the invention provides useful wood preservative compositions that can be applied to the wood by a simple, one-step impregnation procedure.

We claim:

1. As a composition of matter, a novel wood preservative composition containing a graft copolymer of lignosulfonate, hydroxyl benzyl alcohol and a metal salt or a mixture of metal salts in the ratio of from 1:0:0.01 to 1:0.5:1.2, respectively, said graft copolymer is a reaction product of lignosulfonate and acrylic monomers of the general formula: $RCH=CR^1COOH$, where R is hydrogen, an alkyl or carboxyl group and $R^1$ is hydrogen or an alkyl group; said hydroxyl benzyl alcohol has the general formula:

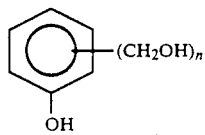

where n is an integer from 1 to 3; and said metal salt is a salt of sulfate, chloride, phosphate or carbonate wherein the metal is selected from the group of copper, zinc, mercury and lead.

2. The composition of claim 1 wherein the lignosulfonate used to form a graft copolymer is sulfonated lignin from spent sulfite liquor, having an organic sulfur content of 3 to 10%.

3. The composition of claim 1 wherein said acrylic monomers are selected from the group of acrylic acid, methacrylic acid, methyl methacrylic acid, and maleic acid.

4. The composition of claim 1 wherein said metal salts are cupric sulfate, cupric chloride, zinc sulfate, zinc chloride, and mercuric chloride.

5. The composition of claim 1 wherein the lignosulfonate used to form a graft copolymer is spent sulfite liquor solids.

6. A novel composition useful for preserving wood comprising at least one metal salt of a graft copolymer of lignosulfonate, said metal is selected from the group of copper, zinc, mercury and lead, and said copolymer is a reaction product of lignosulfonate and acrylic monomers of the general formula: $RCH=CR^1COOH$, where R is hydrogen, an alkyl or carboxyl group and $R^1$ is hydrogen or an alkyl group.

7. The composition of claim 6 further including a hydroxyl benzyl alcohol of the general formula:

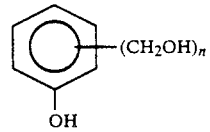

where n is an integer from 1 to 3.

8. The composition of claim 6 wherein the lignosulfonate used to form a graft copolymer is sulfonated lignin from spent sulfite liquor, having an organic sulfur content of 3 to 10%.

9. The composition of claim 8 wherein said acyrlic monomers are selected from the group of acrylic acid, methacrylic acid, methyl methacrylic acid, and maleic acid.

10. A method of preserving wood which comprises contacting the wood with the composition of claim 1.

11. A method of preserving wood which comprises contacting the wood with the composition of claim 8.

12. Wood treated in accordance with the method of claim 10.

13. Wood treated in accordance with the method of claim 11.

* * * * *